United States Patent [19]

Kenigsberg et al.

[11] 4,111,386

[45] Sep. 5, 1978

[54] HELICOPTER ROTOR AND TRANSMISSION MOUNTING AND VIBRATION ISOLATION SYSTEM

[75] Inventors: Irwin Jeffrey Kenigsberg, Trumbull; Larry Bruce Eastman, Monroe, both of Conn.

[73] Assignee: United Technologies Corporation, Hartford, Conn.

[21] Appl. No.: 749,131

[22] Filed: Dec. 9, 1976

[51] Int. Cl.² .............................................. B64C 27/00
[52] U.S. Cl. .................................. 244/17.27; 188/1 B; 248/5; 248/358 R; 416/500
[58] Field of Search .................... 244/17.27, 17.11; 188/1 B; 248/5, 15, 358 R; 416/500

[56] References Cited

U.S. PATENT DOCUMENTS

| 2,648,509 | 8/1953 | Henshaw | 248/5 |
| 2,722,391 | 11/1955 | Krieghoff | 248/5 |
| 3,858,831 | 1/1975 | Halwes | 244/17.27 |
| 3,920,202 | 11/1975 | Mouille | 244/17.27 |
| 3,932,060 | 1/1976 | Vincent et al. | 416/500 X |
| 4,014,484 | 3/1977 | Mouille | 244/17.27 |

FOREIGN PATENT DOCUMENTS

| 1,380,710 | 1/1975 | United Kingdom | 244/17.27 |

*Primary Examiner*—Barry L. Kelmachter
*Attorney, Agent, or Firm*—Vernon F. Hauschild

[57] ABSTRACT

A helicopter rotor and transmission mounting and vibration isolation system in which the transmission is supported from the fuselage by a plurality of elastomeric mounts which are selectively positioned and focused to establish a system roll axis and a system pitch axis on opposite sides of the elastomeric mounts and which mount members are of selected stiffness to establish selected roll stiffness and selected pitch stiffness of the system, to establish the natural frequencies of the system sufficiently below the blade passage frequency to minimize the response of the fuselage to forces and moments imparted by the helicopter rotor and to provide selected torque restraint and lift restraint for the system.

10 Claims, 11 Drawing Figures

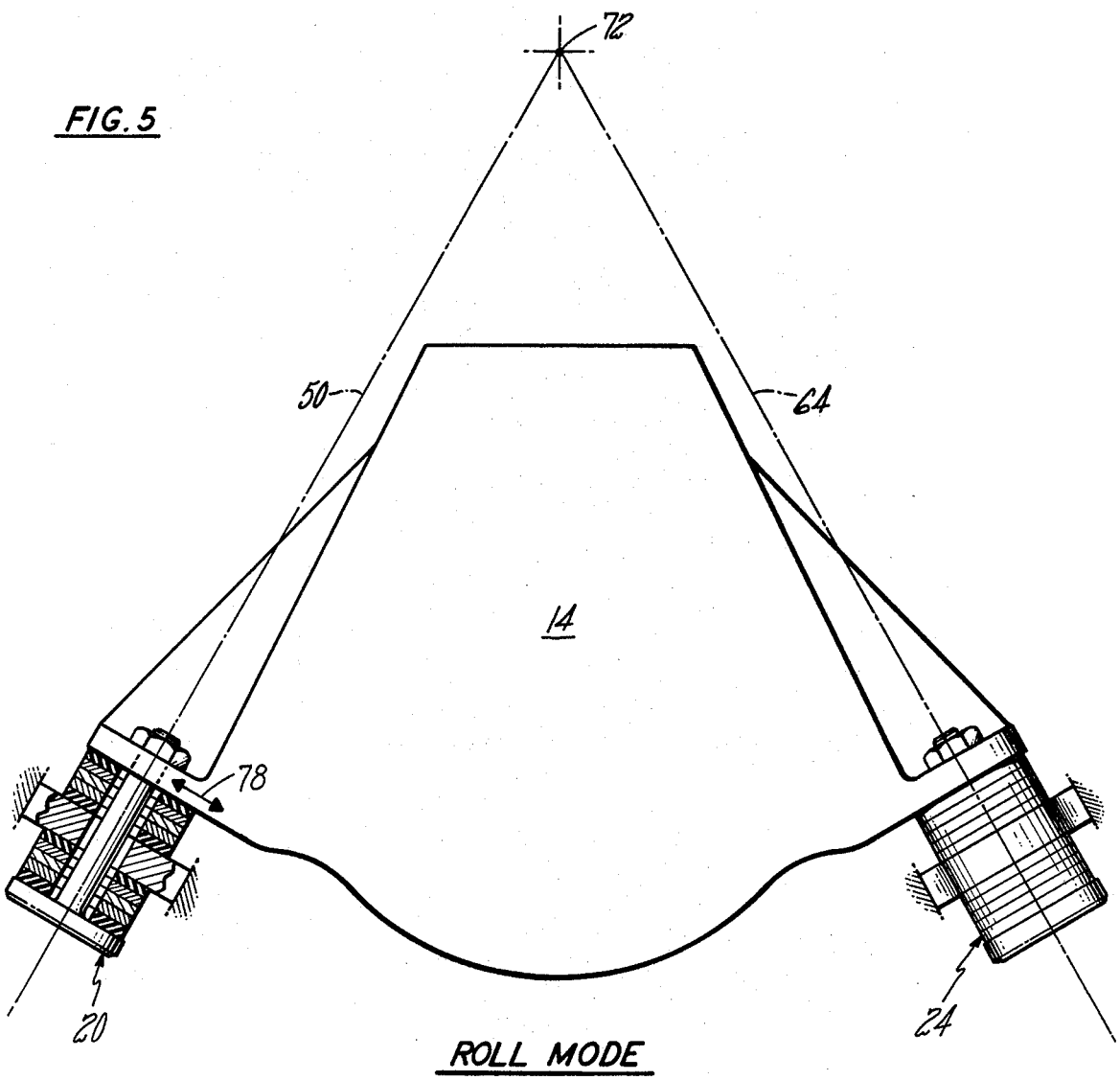

FIG.6  PITCH MODE
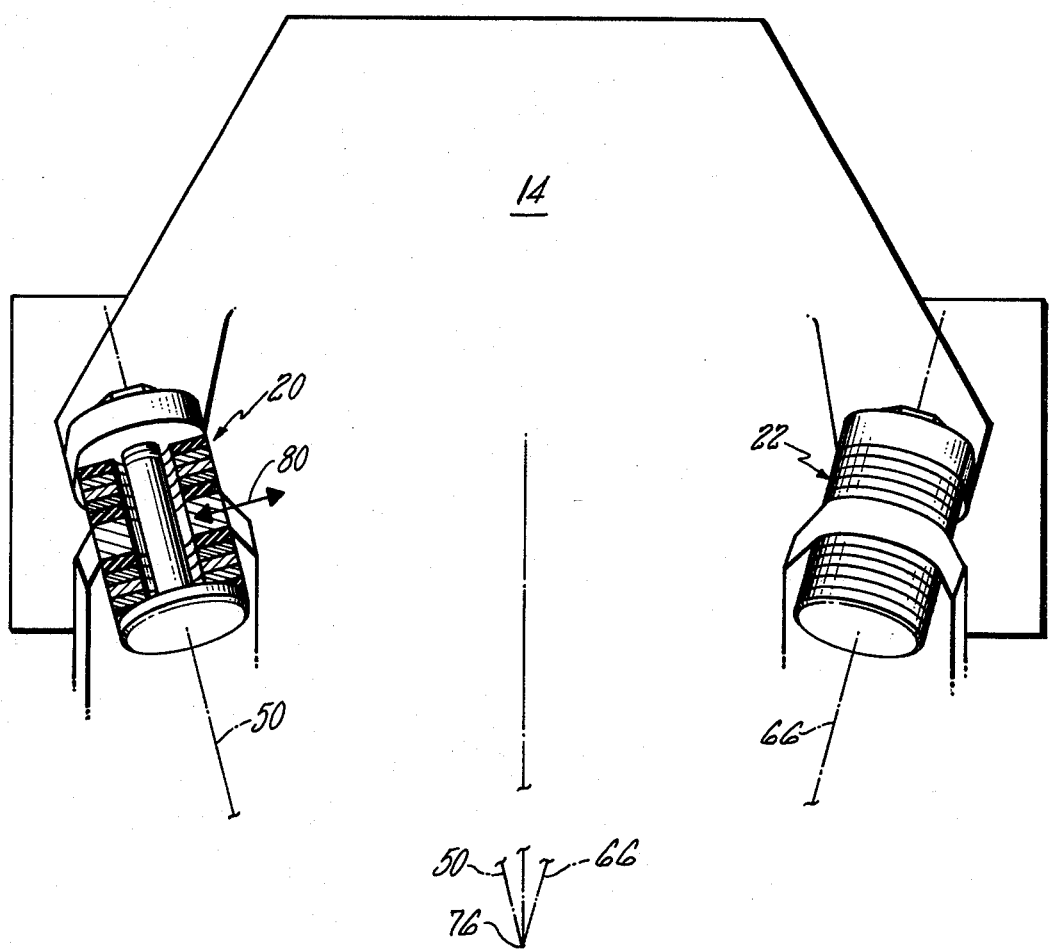
FIG.7
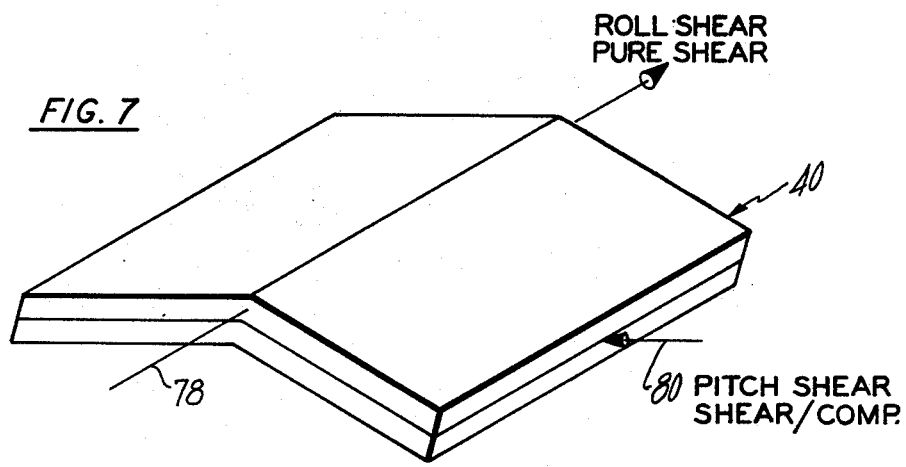

FIG. 8    MISALIGNMENT ENGINE DRIVE SHAFT
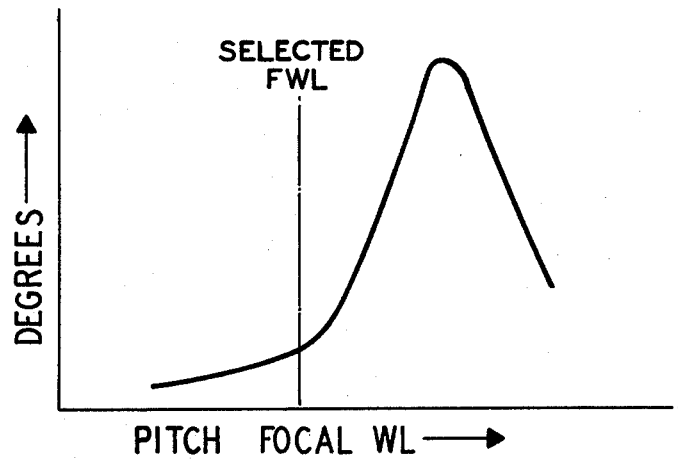
FIG. 9
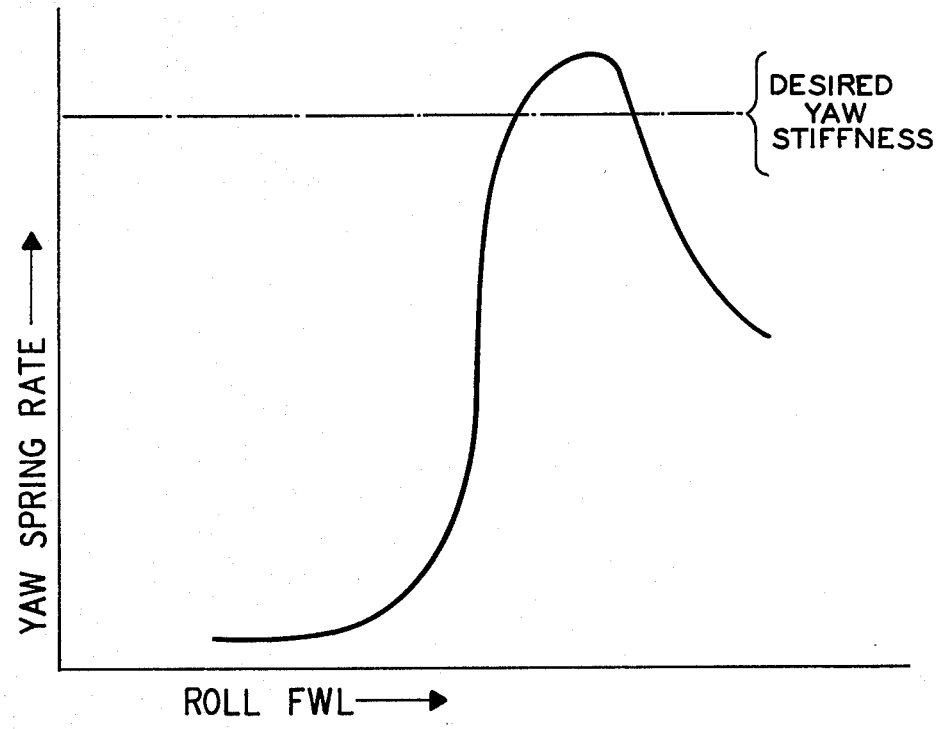

HELICOPTER ROTOR AND TRANSMISSION MOUNTING AND VIBRATION ISOLATION SYSTEM

BACKGROUND OF THE INVENTION

1. Field of the Invention

This invention relates to the supporting of helicopter rotors and transmissions from the helicopter fuselage and particularly to such systems wherein a plurality of elastomeric mounts are selectively positioned and focused and are of selected stiffness that without the aid of any other mechanism these mounts establish system stiffness, produce selected torque and lift restraint, and detune the transmission pitch and roll natural frequencies of the helicopter from the blade passage frequency.

2. Description of the Prior Art

The prior art includes helicopter transmission support systems which focus the pitch and roll axes, such as Halwes Pat. No. 3,858,831, Balke et al. U.S. Pat. No. 3,163,378, Mouille U.S. Pat. No. 3,921,940, and Getline U.S. Pat. No. 2,761,638, but these prior art systems are mechanically complicated, heavy, and expensive because they require auxiliary hardware, beyond the suspension system mounts, to effect yaw restraint, pitch, and roll stiffness, means of limiting motion, and the establishing of system dynamics.

SUMMARY OF THE INVENTION

A primary object of the present invention is to provide a helicopter rotor and transmission mounting and vibration isolation system which includes a plurality of elastomeric mounts supporting the transmission from the fuselage and selectively positioned, focused, and fabricated so that these mounts alone produce selected system roll and pitch stiffness, torque restraint, lift restraint, and establishing system natural frequencies sufficiently below the blade passage frequency to minimize the response of the fuselage to forces and moments imparted by the helicopter rotor.

In accordance with the present invention, such a system is provided to have a roll axis extending longitudinally of the helicopter and positioned preferably above the transmission base and a pitch axis extending laterally of the fuselage and positioned below the transmission base so that the mounts alone so positioned and focused provide system yaw restraint.

In accordance with a further aspect of the present invention, the elastomeric mounts may be so positioned and focused to require and produce differential stiffness in orthogonal directions in the mounts and thereby provide required system pitch and roll stiffness.

It is a further feature of the present invention to teach such a system in which the system pitch axis is selected to provide low airframe response and maximum rotor head translational response to assure effective operation of rotorhead absorbers.

It is a further feature of this invention that with the elastomeric mounts so positioned and focused, system torque restraint is accomplished by elastomer compression within the elastomeric mounts.

It is a very important feature of this invention to provide such an isolation system in which the elastomeric mounts along provide system yaw restraint and that no auxiliary yaw restraint mechanism is required.

It is a further feature of this present invention to provide such a system in which the elastomeric mounts themselves provide stops to limit excessive motion between the transmission and fuselage which would otherwise take place as a result of severe maneuvers.

It is a further feature of the present invention to provide such a system in which the elastomeric mounts eliminate metal-to-metal contact between the transmission and fuselage interface, to thereby reduce the transmission of high frequency acoustic vibration therebetween and accordingly reduce aircraft internal noise.

It is a further feature of this present invention to provide such as system wherein the system pitch and roll axes and the elastomeric mounts stiffness are selected so that the natural frequency of the suspension system is sufficiently below the blade passage frequency to detune the helicopter transmission pitch and roll modes of vibration from the blade passage frequency to prevent resonance and thereby allow a minimum of fuselage response to blade passage frequency in-plane forces and moments which the rotor imparts to the helicopter.

It is a further object of the present invention to provide such a system in which the system natural frequency is determined by the positions of the roll and pitch axes and the pitch and roll stiffness of the elastomeric mounts, and in which system torque restraint is determined by the selected positioning of the pitch and roll axes and the compressive stiffness of the elastomeric mounts.

It is a further feature of the present invention to provide such a system in which the elastomeric mounts are preloaded only sufficiently to keep them in compression and out of tension loading throughout their range of operation.

It is a further object of this invention to teach such a suspension system in which the flexible mounts utilized may be used to tune the airframe dynamics so as to minimize response to rotor excitation and which is especially adapted for use in combination with rotor in-plane vibration absorbers which serve to reduce rotor excitations.

BRIEF DESCRIPTION OF THE DRAWINGS

FIG. 5 is an illustration of our transmission and rotor suspension system in roll mode.

FIG. 6 is an illustration of our transmission and rotor suspension system in pitch mode.

FIG. 7 is a representation of a single elastomer laminate from one of our elastomeric mounts to show the orientation thereof to produce pitch and roll shear stiffness so as to be different, if required.

FIG. 8 is a graph of engine drive shaft misalignment plotted against pitch focal water line.

FIG. 9 is a graph of suspension system yaw stiffness plotted against suspension system roll focal water line for the selected system pitch focal water line.

DESCRIPTION OF THE PREFERRED EMBODIMENT

Figure 1:
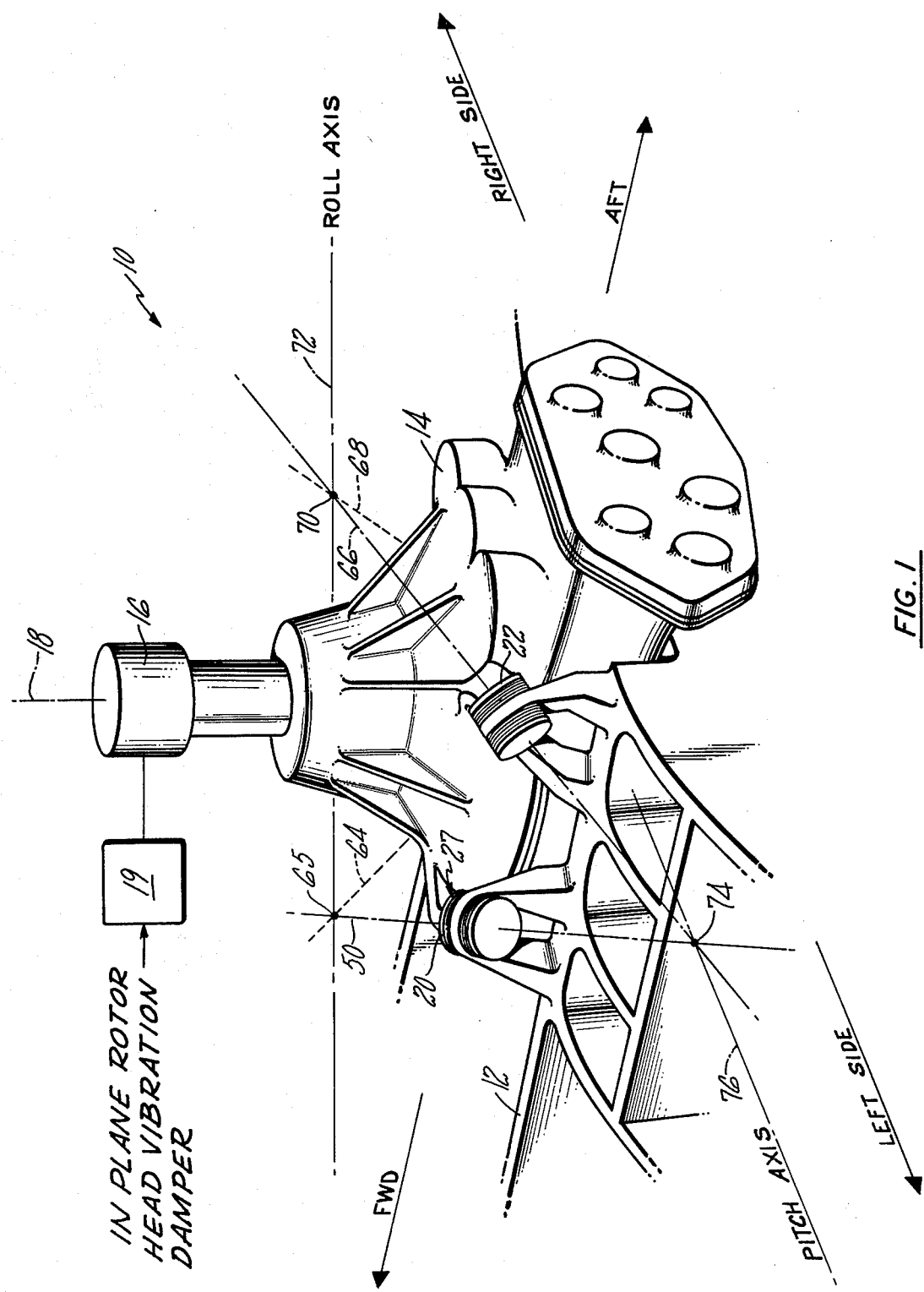
FIG. 1 is a perspective showing of our suspension and vibration isolation system supporting a helicopter transmission and rotor from the fuselage of a helicopter.
Figure 2:
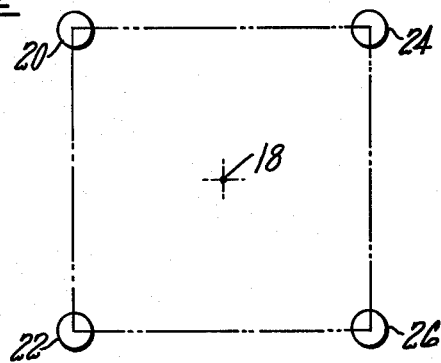
FIG 2 is a schematic top view of such a helicopter to illustrate one pattern of mount positioning for our suspension system.
Figure 3:
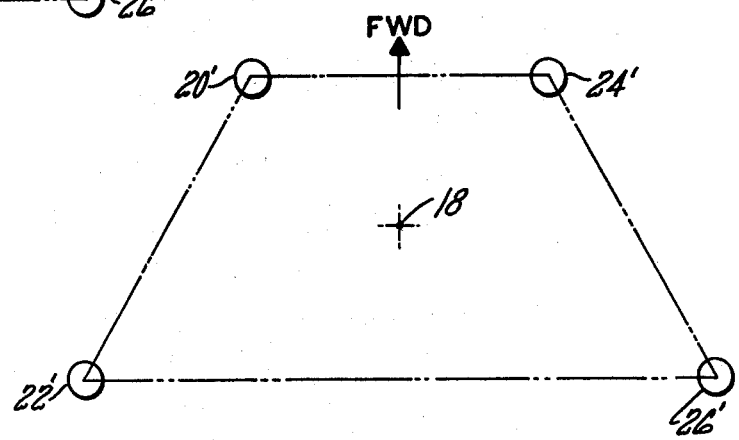
FIG. 3 is a schematic top view of a helicopter showing a second possible pattern of mount positioning for our suspension system.
Figure 4:
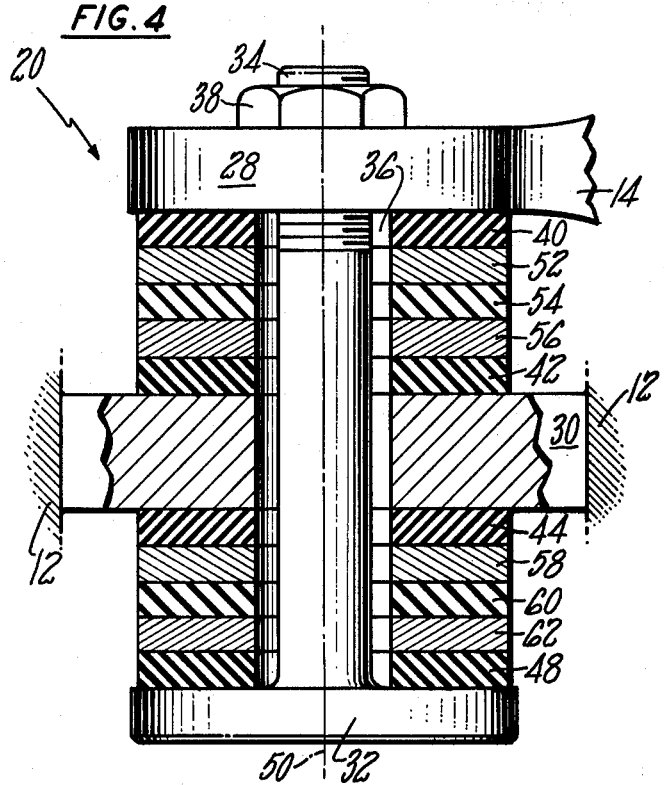
FIG. 4 is a cross sectional showing through one of the elastomeric mounts used in our suspension system.

Referring to FIG. 1 we see a portion of helicopter 10 which includes fuselage 12, main rotor transmission 14, and main lift rotor 16. In conventional fashion, transmission or gearbox 14 supports and drives helicopter rotor 16 for rotation about axis of rotation 18 so that rotor 16, which may be of any selected number of blades, will serve to lift and propel helicopter 10, one or more rotor head vibration dampers 19, preferably of the bifilar type taught in U.S. Pat. No. 3,181,815, to damp in-plane rotor vibrations. A conventional engine, not shown, drives transmission 14 so that it may perform its rotor driving function. Transmission 14, and hence rotor 16, are supported from fuselage 12 by a plurality of elastomeric mounts, hereinafter called flexmounts, two of which are shown at 20 and 22, and which flexmounts constitute the sole support of transmission 14 and rotor 16 from helicopter fuselage 12. While only two such mounts are shown in FIG. 1, it will be evident to those skilled in the art that, as best shown in FIGS. 2 and 3, the flexmounts are circumferentially oriented about transmission 14 and may be, as shown in FIG. 2, in the form of a rectangle with four identical mounts 20, 22, 24, and 26 positioned at the corners of a rectangle in which rotor axis 18 is centrally positioned or, as best shown in FIG. 3, these mounts, now designated as 20', 22', 24', and 26', may be positioned at the corners of a trapezoid in which rotor axis 18 is centered. Flexmounts 20–26 constitute main rotor and transmission support and vibration isolation system 27. It will also be evident to those skilled in the art that the system embodiment is not limited to the constructions of FIGS. 2 and 3 but can be applied as well to transmission whose base forms any geometric pattern, not limited to four flexmounts, and also with rotor shafts 18 which are not centrally located. The advantage of the rectangular construction of FIG. 2 is a uniform distribution of shear and compressive loading among the elastomeric mounts. The construction of the flexmount is best shown in FIG. 4 in which one such mount, mount 20, is illustrated. In flexmount 20, a stack of alternate laminates or layers of elastomer and metal is positioned between the transmission and the fuselage. In particular, one such stack of alternate elastomer and metal laminates is positioned between transmission flange 28 and plate member 30, which is supported from fuselage 12. A second stack of alternate laminates of elastomer and metal is positioned between plate member 30 and the head 32 of bolt member 34, which passes through the bore 36 in the laminates and plate member 30 and which threadably engages nut member 38 so that the laminate stacks may be preloaded sufficiently so as to remain in compression throughout their modes of operation and thereby avoid tension loading therein. It will be evident to those skilled in the art that other methods of preloading and assembly can be employed. It is important that the alternate stacks of laminates such as 40, 54, 42, 44, 60, and 48 and metal shims such as 52, 56, 58, and 62 provide the load path from the transmission to the airframe and thereby avoiding metal-to-metal contact between the two so as to prevent the transmission of high frequency vibration through the flexmount 20 from the transmission 14 to the fuselage 12 thereby reducing the internal noise in the aircraft. In view of the construction of flexmount 20, axis 50 becomes the focal line of flexmount 20 as described hereinafter.

Referring again to FIG. 1 it is important to note that mounts 20, 22, 24, and 26, 20 and 22 only being visible in FIG. 1, are focused so that focal line 50 of flexmount 20 and focal line 64 of flexmount 24 intersect at point 65, while focal line 66 of flexmount 22 and focal line 68 of flexmount 26 intersect at point 70, thereby establishing system roll axis 72 extending longitudinally of helicopter 10 and positioned above transmission 14, or at least above the base thereof and above mounts 20–26. Still viewing FIG. 1 it will be noted that focal lines 50 and 66 of the flexmounts 20 and 22, which are positioned on the left or port lateral side of transmission 14, intersect at point 74, while focal lines 64 and 68 of flexmounts 24 and 26, the mounts positioned on the right or starboard side of transmission 14, intersect at a second point not visible in FIG. 1 but which cooperates with point of intersection 74 to establish system pitch axis 76 extending laterally of helicopter 10 and positioned in off-set vertical relationship to roll axis 72 at a location below the base of transmission 14 and below mounts 20–16. By so focusing mounts 20, 22, 24, and 26, the system roll axis 72 and pitch axis 74 are so established and these four flexmounts when so positioned and focused, provide yaw restraint to the suspension system 27 without the need of any additional yaw restraining mechanism. It will be evident to those skilled in the art that pitch axis 76 could be above transmission 14 and roll axis 72 below the transmission, if desired.

This focusing concept is further illustrated by viewing FIGS. 5 and 6. Viewing FIG. 5, which is a view of transmission 14 illustrated in roll mode from aft thereof, it will be noted that the focal lines 50 and 64 of mounts 20 and 24, respectively, intersect on roll axis 72, about which system roll motions will occur, thereby establishing roll shear line 78 normal to focal line 50 of mount 22. Because of the high compressive to shear stiffness ratio of the flexmounts, the elastomer and metal laminates of flexmount 20 shown in FIG. 4 must deform essentially parallel to roll shear line 78.

Viewing FIG. 6, we see transmission 14 illustrated in pitch mode and note that the focal lines 50 and 66 of mounts 20 and 22, respectively, intersect at pitch axis 76 so that all pitch motion of the suspension system 27 must be about axis 76 thereby establishing pitch shear line 80 for mount 20 normal to focal line 50 and all elastomer and metal laminates of flexmount 20 must deform essentially parallel to pitch shear line 80. It should be noted that in both pitch and roll mode and all combinations thereof the flexmounts 20–26 serve as positive stops for transmission-to-fuselage motion because the lateral movement of the laminates causes bolt 34 to translate laterally until it abuts member 30, to form a positive stop therewith.

It will accordingly be seen that the plane in which the elastomer and metal laminates of mount 20 are to be located must be parallel to both roll shear line 78 and pitch shear line 80, to thereby properly establish the orientation of the laminates. The laminates of the other mounts 22, 24, 26 are similarly oriented with respect to the roll shear lines and pitch shear lines established therein by roll and pitch mode of transmission 14 about roll and pitch axis 72 and 76.

One shear stiffness of the flexmount may be required to be higher than the other shear stiffness in order to meet the system natural frequencies. The roll shear line 78 and the pitch shear line 80 are nearly orthogonal thus permitting the use of a flexmount having different shear stiffness in two orthogonal directions and properly oriented about lines 50, 64, 66, 68 on installation so that one of the two shear stiffnesses is nearly coincident with the pitch shear line 80 and the other of the two shear stiffnesses with the roll shear line 78. This is best illustrated by viewing FIG. 7 which shows an elastomeric laminate, such as 40 of any of mounts 20, 22, 24, 26 selectively oriented so that roll shear line 78 passes therethrough so as to impose a pure shear load thereon and pitch shear line 80 passes therethrough so as to impose a combination shear and compressive load thereon, thereby causing laminate 40 and its associated flexmount to be stiffer in pitch than in roll.

The natural frequency of transmission 14 is determined by the positions of the roll and pitch axes 72 and 76 and by the pitch and roll stiffness of the flexmounts 20–26. The torque restraint of the suspension system 27 is determined by the positions of pitch and roll axes 72 and 76 and by the compressive stiffness of the flexmounts 20–26.

It is an important teaching of our invention that the roll and pitch axes of the suspension system and the flexmount stiffness is selected so that the natural frequency of the transmission 14 is well below the blade passage frequency (rotor rpm times the number of blades, i.e., 4/rev for four bladed rotor) so that the fuselage is vibration isolated from the blade passage frequency inplane forces and moments which the rotor imparts to the transmission. Further, the durometer of the elastomer used in fabricating the elastomer laminates determines the shear stiffness of the flexmounts and the durometer of the elastomer plus the laminate construction, namely, thickness of elastomers and thickness of metal shims, determines the compressive stiffness of the flexmount.

The manner in which the pitch and roll axes and stiffness of suspension system 27 as determined in carrying out the teachings of our invention will now be described. It must be borne in mind that many compromises must be made in the process to produce the most desirable results for the suspension system under consideration. We may begin by selecting the natural frequency of our suspension system 27 so that it will accomplish our desired result in the detuning of the fuselage from rotor excitation. Let us assume that we have selected a suspension system natural frequency, $W_n$, as some multiple of the main rotor rotational speed.

For either or both roll or pitch considerations we can express the formula:

$$W_n = \sqrt{(K_o/I)} \qquad \text{EQUATION 1}$$

where $W_n$ equals the system natural frequency in roll or pitch, whichever is under consideration, where $K_o$ equals the rotational spring rate about the pitch or roll focal point. Equation 1 may be rewritten as follows:

$$\sqrt{NK_{shear} L^2/I_o + MD^2} \qquad \text{EQUATION 2}$$

where $L$ is the distance from the flexmount elastomer to that focal point, where $N$ is the number of flexmounts, where $M$ is the mass of the transmission and rotor, where $D$ is the distance from that focal point to the center of gravity of the transmission, and where $I_o$ is the mass moment of inertia of the transmission about its center of gravity. In Equation 2, $W_n$, $I_o$, and $M$ are constants and $L$ and $D$ will vary as the system focal axis varies.

Solving for $K_{shear}$ in Equation 2 we establish the equation:

$$K_{shear} = \frac{W_n^2 (I_o + M(D)^2)}{NL^2} \qquad \text{EQUATION 3}$$

Equation 3 can be so established both for $K_{shear\ roll}$ and $K_{shear\ pitch}$.

The terms pitch focal water line and roll focal water line will be used hereinafter in connection with this explanation and it should be borne in mind that the roll focal water line is the place where the roll axis of the suspension system passes through the rotor shaft and the pitch focal water line is the place where the pitch axis of the suspension system passes through the rotor shaft extended. By observing our Equation 3 it will be noted that for any given focal water line, L and D will be established so that $K_{shear}$ may be solved for using Equation 3.

Figure 10:
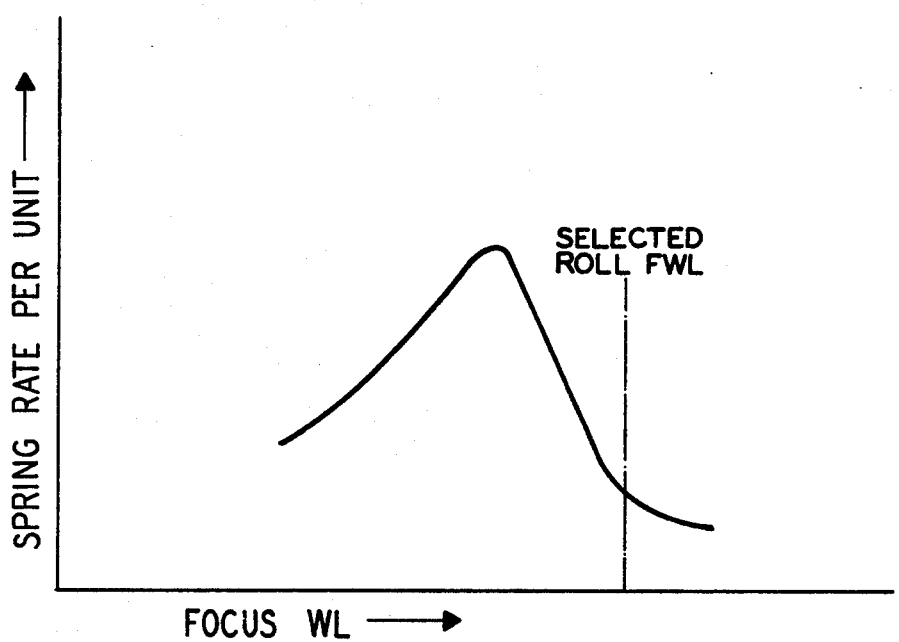
FIG. 10 is a graph of suspension $K_{shear\ roll}$ plotted against system roll focal water line for a selected system roll natural frequency $W_n$ (roll).
Figure 11:
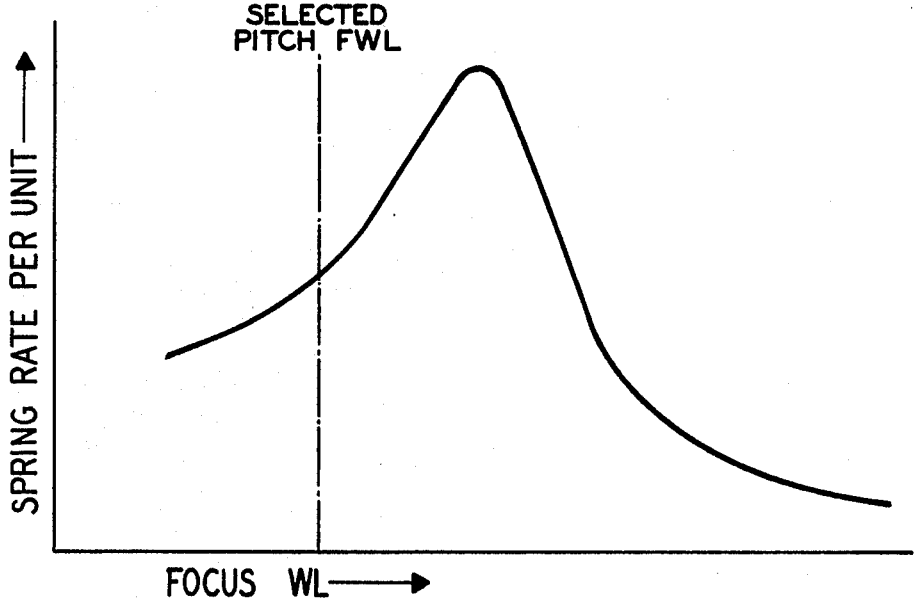
FIG. 11 is a graph of $K_{shear\ pitch}$ plotted against pitch focal water line for a selected system pitch natural frequency $W_n$ (pitch).

Now considering FIG. 8, we see the first of our four graphs which are used as tools in the selection of roll and pitch axes and stiffness of our suspension system. In FIG. 8, our graph ordinates are misalignment and pitch focal water line. In utilizing FIG. 8 we have selected a given pitch focus which will accommodate required misalignment. The next factors to be chosen are yaw stiffness and roll focus. While it is desirable for our suspension system to have maximum yaw stiffness or restraint, compromises must be made in the selection of yaw stiffness and roll focus to accommodate practical consideration such as size of the flexmounts, clearances between the flexmount and the transmission and airframe, manner in which the flexmounts are attached to the transmission, loads on the airframe and transmission, and vertical flexibility of the system. In producing the FIG. 9 graph, we utilize the selected pitch focal water line, and solve for yaw stiffness which is primarily a function of flexmount compressive stiffness for various assumed roll water lines so as to be able to plot the preferred curve shown in FIG. 9. It will be noted that the desired yaw stiffness is obtained with a given pitch focal water line at two different roll focal water lines. The roll focal water line selected is that which is consistent with the aforementioned practical considerations. We will take the roll focal water line selected from FIG. 9 and go to FIG. 10 which is a plot of $K_{shear\text{-}roll}$ against roll focal water line for the desired $W_n$ and we determine the required roll stiffness. We would then go to FIG. 11, which is a plot of $K_{shear\ pitch}$ plotted against pitch focal water line for the selected $W_n$ pitch and plot the selected pitch focal water line as shown and determine the required pitch shear.

With this data at hand we would then select the roll focal water line and pitch focal water line best suited overall for our suspension system 27, thereby establishing pitch axis 76 and roll axis 72 by examining these data and selecting the preferred pitch focal water line, roll focal water line to produce the desired yaw stiffness and the optimum $K_{shear\ roll}$ and $K_{shear\ pitch}$ for our particular suspension system considerations and with consideration for the previously enumerated compromises.

Another feature of our suspension system is that it permits us to select a suspension system pitch axis so as to produce low airframe response and maximum rotor head longitudinal response to vibratory rotor forces.

This is accomplished by keeping the pitch axis as far below the rotor head as possible, thus, amplifying the small residual pitch response of the fuselage into large in-plane response of the rotor head required for effective operation of in-plane rotor absorbers. With the pitch axis located well below the transmission and rotor, rotor motions thereabout will be substantially inplane, thereby increasing the effectiveness of the rotor in-plane vibration dampers. Such efficient rotor in-plane vibration damping reduces the amplitude of vibration transmitted from the rotor to the fuselage through flexmounts 20–26.

We wish it to be understood that we do not desire to be limited to the exact details of construction shown and described, for obvious modifications will occur to a person skilled in the art.

We claim:

1. A helicopter having:
   (A) a main lift rotor,
   (B) a transmission supporting and driving the rotor for rotation about an axis of rotation,
   (C) a fuselage, and
   (D) a rotor and transmission support and vibration isolation system supporting the transmission from the fuselage and including:
   (1) a plurality of elastomeric mount members each of selected compression stiffness and each having a selectively oriented axis and being connected to the fuselage and supporting the transmission therefrom and comprising:
   (a) alternate layers of elastomer and metal laminates stacked in compression between the fuselage and the transmission with an elastomer layer in contact with the fuselage and the transmission to thereby reduce the transmission of acoustic vibration therebetween to reduce internal noise in the helicopter and with the laminates positioned concentrically about the mount member axis so that said laminates are oriented normal to said axis, and with each mount member defining a focal line coincident with its axis so that the roll and pitch shear lines for each elastomer laminate are normal to the mount focal line and with each mount member focal line intersecting a corresponding focal line of other mount members so as to define a mount system roll axis extending longitudinally of the fuselage and displaced vertically on one side of said mount members and a mount system pitch axis extending transversely of the fuselage and displaced vertically on the other side of said mount members from said roll axis, and so that said axes are off-set from said mount members a selected distance to establish vibration isolation through said mount members between said fuselage and said transmission about both said pitch and said roll axes and so that with said system pitch and roll axes so positioned said mount members along provide substantial system yaw restraint which is accomplished by compression loading of the elastomer laminates of the mount members in response to transmission yaw motion.

2. A helicopter according to claim 1 wherein said mount elastomer laminates are of selected shear and compressive stiffness to establish transmission natural frequencies sufficiently below the rotor blade passage frequency so as to isolate the fuselage from blade passage frequency forces and to also establish the magnitude of torque restraint.

3. A helicopter according to claim 1 wherein said roll axis is above the mount members and the pitch axes is below the mount members to provide transmission yaw restraint.

4. A helicopter according to claim 3 and including at least one in-plane vibration absorber operatively associated with the rotor so that rotor motion about said pitch axis is substantially in-plane to maximize absorber efficiency.

5. A helicopter according to claim 1 wherein said mount members are preloaded sufficiently to keep them in compression loading during all modes of operation.

6. A helicopter according to claim 1 wherein said mount members are selectively constructed, positioned, and oriented to produce differential stiffness therein in orthogonal directions.

7. A helicopter according to claim 6 wherein said plurality of mount members comprise four mount members with two such mount members being forward mount members located forward of the rotor axis of rotation and on opposite lateral sides thereof and with the two remaining mount members being after mount members located aft of said rotor axis of rotation and on opposite lateral sides thereof.

8. A helicopter according to claim 7 wherein said after mount members are oriented so that the after mount member focal lines intersect on said roll axis, so that the forward mount member focal lines intersect on said roll axis, and so that the focal lines of the two mounts on one lateral side of the transmission intersect on the pitch axis, and so that the focal lines of the two mounts on the opposite lateral side of the transmission intersect on said pitch axis to thereby establish said roll and pitch axes offset above and below said transmission, respectively, for transmission yaw restraint which is accomplished by placing the mount member elastomer in compression with the mounts so oriented.

9. A helicopter according to claim 1 and including positive stop means operatively associated with said mount members.

10. A helicopter according to claim 1 wherein said roll axis is below the transmission base and the pitch axis is above the transmission base to provide transmission yaw restraint.

* * * * *

UNITED STATES PATENT OFFICE
CERTIFICATE OF CORRECTION

PATENT NO. : 4,111,386
DATED : September 5, 1978
INVENTOR(S) : Irwin J. Kenigsberg et al It is certified that error appears in the above-identified patent and that said Letters Patent are hereby corrected as shown below:

Column 1, Line 64    "along" should be "alone"

Column 2, Line 10    After "such" "as" should be "a"

Column 4, Line 23    "16" should be "26"

Column 8, Line 2     "along" should be "alone"

*Signed and Sealed this*

*Twenty-ninth* Day of *May 1979*

[SEAL]

Attest:

RUTH C. MASON
*Attesting Officer*

DONALD W. BANNER
*Commissioner of Patents and Trademarks*